United States Patent [19]

Adelman

[11] Patent Number: 4,601,157
[45] Date of Patent: Jul. 22, 1986

[54] AUTOMATIC PACKAGING

[75] Inventor: Herbert B. Adelman, Hockessin, Del.

[73] Assignee: The Crowell Corporation, Newport, Del.

[21] Appl. No.: 589,699

[22] Filed: Mar. 15, 1984

[51] Int. Cl.⁴ .......................... B65B 9/02; B65B 51/30
[52] U.S. Cl. ........................................ 53/450; 53/463; 53/477; 53/141; 53/172; 53/553; 53/373
[58] Field of Search ................. 53/450, 449, 463, 477, 53/373, 472, 553, 172, 141

[56] References Cited

U.S. PATENT DOCUMENTS

| | | |
|---|---|---|
| 2,549,122 | 4/1951 | Osterhof . |
| 2,737,764 | 3/1956 | Lewis ................................ 53/450 X |
| 3,189,702 | 6/1965 | Wall et al. ........................ 53/450 X |
| 3,229,442 | 1/1966 | Gram . |
| 3,411,263 | 11/1968 | Smolderen et al. . |
| 3,466,214 | 9/1969 | Polk et al. . |
| 3,477,194 | 11/1969 | Corrsin ............................. 53/463 X |
| 3,503,175 | 3/1970 | Marasso et al. ................. 53/450 X |
| 3,623,891 | 11/1971 | Coffey ............................. 53/463 X |
| 3,625,802 | 12/1971 | Schnlepp . |
| 3,669,786 | 6/1972 | Moore . |
| 3,735,551 | 5/1973 | Pratt ................................. 53/450 X |
| 3,792,561 | 2/1974 | Carnes . |
| 4,085,560 | 4/1978 | McClosky . |
| 4,110,954 | 9/1978 | Olsson . |
| 4,207,667 | 6/1980 | D'Angelo . |
| 4,249,364 | 2/1981 | Kawasaki et al. ................ 53/373 X |
| 4,253,892 | 3/1981 | D'Angelo et al. . |
| 4,299,075 | 11/1981 | Gram . |
| 4,305,240 | 12/1981 | Grevich et al. ...................... 53/373 |
| 4,364,892 | 12/1982 | Rehlen . |

Primary Examiner—Horace M. Culver
Attorney, Agent, or Firm—Connolly & Hutz

[57] ABSTRACT

Heat sealing of foam-paper laminates and the like around articles to cushion them. Foam can be coated with anti-stat and/or corrosion inhibitor to protect articles against static electricity and/or corrosion. Such coatings can reduce the heat sealing temperature. Laminate portions to be heat sealed can be pre-heated to shorten heat sealing dwell.

9 Claims, 5 Drawing Figures

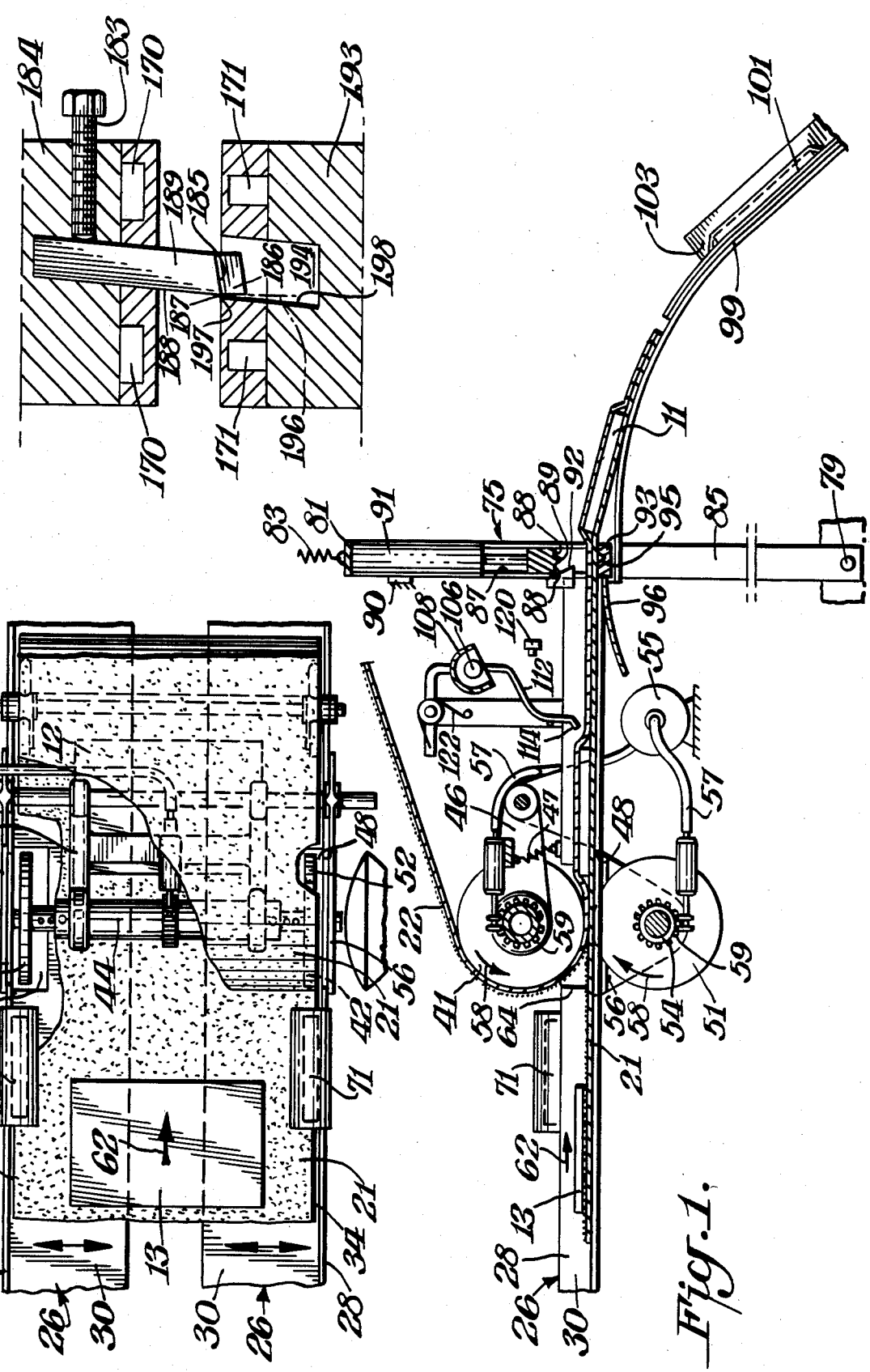

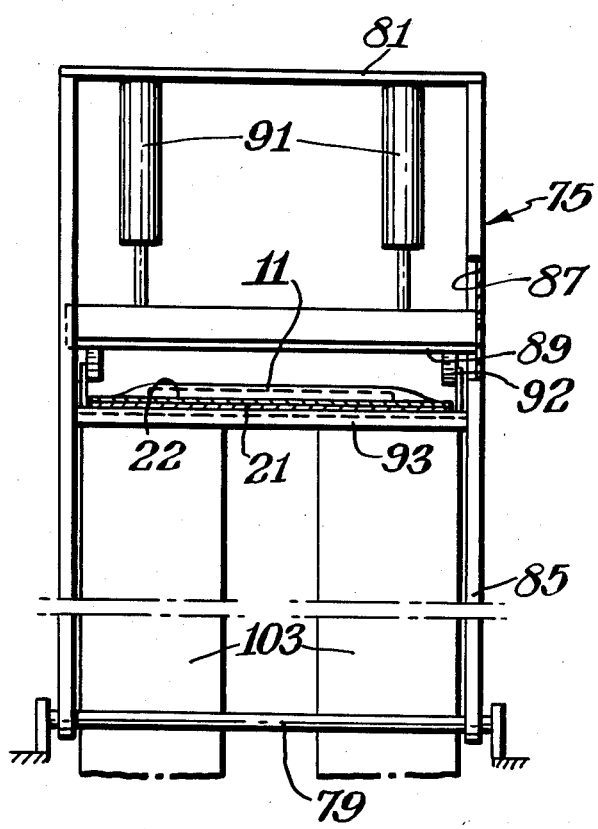
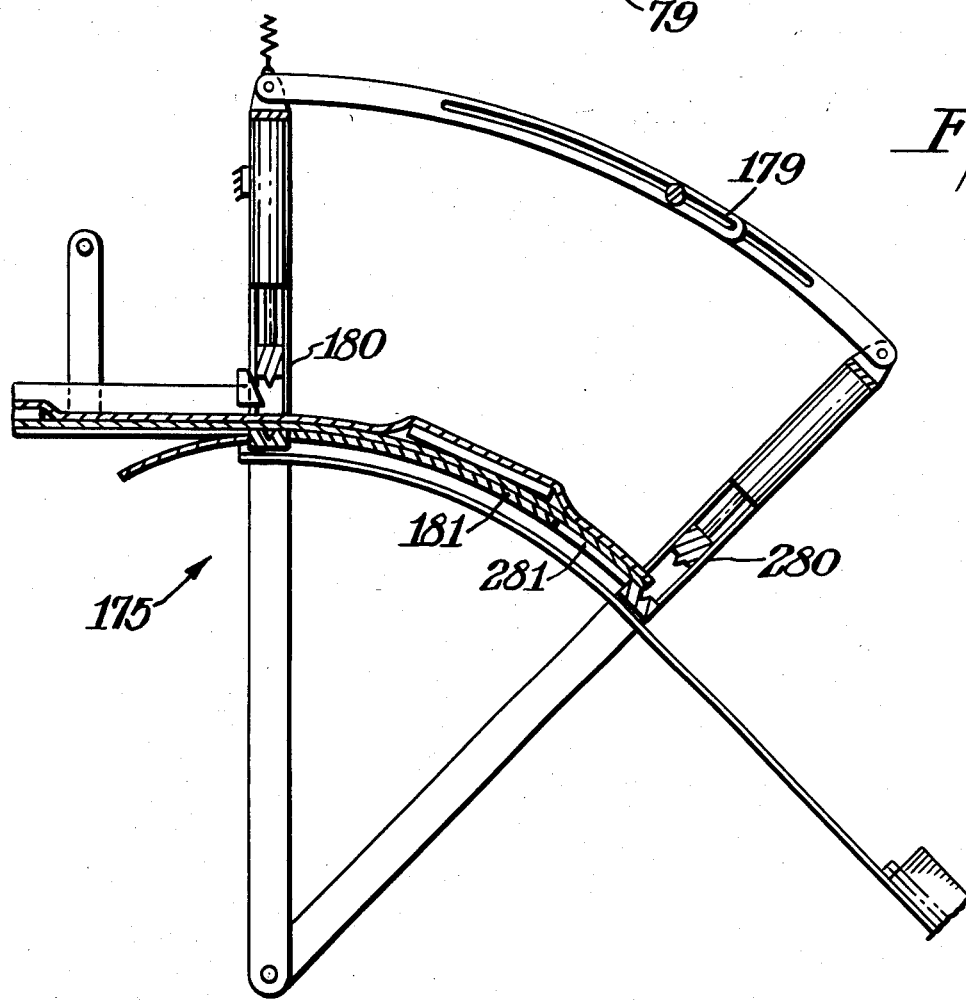

AUTOMATIC PACKAGING

The present invention relates to automatic packaging of articles that are to be shipped or otherwise transported.

Among the objects of this invention is the improved automatic packaging of articles that are to be protected against mechanical shock as well as against static electricity or corrosion.

The foregoing as well as additional objects of the present invention will be more fully understood from the following description of several of its exemplifications, reference being made to the accompanying drawings in which:

FIG. 1 is a vertical sectional view, somewhat diagramatic, of a packaging arrangement according to the present invention;

FIG. 2 is a plan view, also somewhat diagrammatic, of the packaging arrangement of FIG. 1;

FIG. 3 is a view, again somewhat diagrammatic, of the packaging arrangement of FIG. 1, taken generally along line 3—3;

FIG. 4 is a broken away sectional view similar to that of FIG. 1, showing a modified form of packaging arrangement representative of the present invention; and FIG. 5 is a sectional view of a modified cutting and heat-sealing structure pursuant to the present invention.

The practice of packaging articles by sandwiching them between cemented-together supported foam sheets such as paper-foam laminates, leaves something to be desired for some types of articles. Thus where the articles are printed circuit boards or the like that are sensitive to static electric charges, the packaging material should be treated with anti-static agents. Unfortunately anti-static agents tend to lose their effectiveness when combined with or covered by the cohesive-nonadhesive coatings that are particularly desirable for use to cement together the packaging sheets without heating.

A similar difficulty exists with respect to articles that should be protected against corrosion while packaged. Corrosion inhibitors such as the well-known volatile corrosion inhibitors, some of which are referred to in U.S. Pat. Nos. 4,321,297, 4,308,168, 4,251,462, 4,374,174, 3,080,211, and 2,829,030, tend to deleteriously affect cohesive-nonadhesive coatings.

Cohesive-nonadhesive coatings have been very desirable because they are inexpensively applied to supported foam during the manufacture of such foam laminates, and they are very effectively used to cold cement such foam layers to each other, but are otherwise not adhesive so that they do not have to be protected by coverings to keep them from sticking to other objects after they are manufactured and before they are cemented together.

According to the present invention the cohesive-nonadhesive coatings are eliminated and the anti-static and corrosion-inhibiting coatings used to lower the melting range of the foams so that they are easily heat-sealed together. Although heat sealing generally takes more time than the cold pressure sealing that has been used with the cohesive-nonadhesive coatings, the automatic heat-sealing of a sequence of articles into successive packages pursuant to the present invention is effected at a rate very close to if not faster than the prior art cold sealing.

Turning now to the drawings, FIGS. 1, 2 and 3 show a succession of relatively flat boards 11, 12, 13 being packaged between two paper-foam packaging laminates 21, 22. These laminates can be of the types described in U.S. Pat. No. 4,321,297, carrying an anti-static or corrosion-inhibiting layer or a layer that contains both an anti-stat and a corrosion inhibitor, on the face of the foam. The foam layer itself is preferably one that heat seals at about 100° C. and is no thicker than about 3/16 inch. The antistat and/or corrosion inhibitor lowers the heat sealing temperature to about 95° C. The backing for the foam is preferably not over about 1/16 inch thick with a tensile strength at least 20 times that of the foam layer.

Each laminate 21, 22 is provided as a long sheet rolled up and held on a dispensing reel, not illustrated. Sheet 21 is fed foam side up onto a spaced pair of adjustable supporting angles 26 adjusted so that the floors 28 of the angles are essentially in a horizontal plane, with flanges 30 extending upwardly and closely fitted about the sheet's side edges 34.

Sheet 21 is pulled longitudinally along the guiding angles by two pair of gripping discs 41, 42 and 51, 52. Discs 51, 52 are fitted to an adjustable shaft 54 that is rotatably held in two brackets 56 mounted under the supporting angles 26. Discs 41, 42 are similarly fitted to an adjustable shaft 44 above the guides, rotatably held by an arm 46 that is resiliently pressed downwardly as by spring 47 to cause the upper discs 41, 42 to pinch against the lower discs through slots 48 cut in the angle floors 28. Either or both pairs of discs are rotated in the direction of arrows 58 as by sprockets 59 mounted on the disc shafts and driven by worms connected by flexible shafts 57 to the opposite ends of the armature of a drive motor 55, so that the outer face of each disc is exposed. The discs pinch the packaging sheet 21 between them and in this way pull that sheet in the direction of arrow 62 along the supporting angles. Notches 64 are cut out of the upwardly extending flanges 30 to keep them from covering the outer faces of discs 41, 42.

The articles 11, 12 and 13 are placed on designated spaced locations on the foam face of sheet 21 as it is pulled along. At the same time the second packaging sheet 22 is pulled from its dispensing reel to engage the edges of discs 41, 42 and to be thus pulled down into firm foam-to-foam engagement with the lower sheet downstream of where the articles to be packaged are placed on the lower sheet.

The outer faces of all the discs are heated by reflector-equipped heat lamps 70 placed so that they focus infra-red radiation on those faces as well as on the adjacent edge portions of the packaging sheets. Additional heat lamps 71 can be aimed directly at the sides of the sheet faces at locations just upstream of the disc edges to further preheat all or some of those sheet edges immediately before they are pinched together by the discs. This preheating supplements the preheating of the upper sheet as it is pulled around the hot edges of upper discs 41 from the disc tops to the disc bottoms. For best results the preheating of lamps 71 is confined essentially to the narrow sheet locations at which the pinching and sealing take place.

The frame has an upper cross piece 81 held by springs 83 that extend to an overhead mounting site, to thus hold the frame in its upright position, as illustrated. The side members 85 of the frame have their upper portions in the shape of channels 87 that open towards each other to provide tracks within which is slidably fitted a guillotine cutter 89 that extends transversely of the packaging sheets and is as long as the widest packaging sheets to be processed. Cutter 89 is connected for vertical reciprocation by a pair of air cylinders 91 actuated by flexible air hoses that are not illustrated. An anvil 93 is fixed between the frame side members 85, and has a slot 95 to receive the guillotine blade as well as embedded electric resistance heaters that heat the anvil to heat-sealing temperature. Similar heaters can be incorporated in the guillotine cutter 89 on either side 88 of its cutting blade. The lower faces at 88 are horizontally flat so that when the cutter is propelled downwardly the faces at 88 forcefully engage the packaging sheets and press them against heated anvil 93. This act of propulsion also transversely cuts the packaging sheets and is timed so that it occurs when a portion of the packaging sheets about halfway between successive packaging articles, is over the anvil.

The forceful pressing of the cutter against the anvil is maintained for the length of time needed for the heat from the anvil and from heaters at 88 to effect a transverse heat-sealing across the packaging sheets. This may take as long as a second or so, and during that time the packaging sheets continue to be advanced by the pinching discs to push the cutter-and-anvil assembly in the advancing direction, to pivot the cutter frame 77 around its pivot 79. When the transverse heat-sealing is completed the air cylinders 91 cause the guillotine cutter 89 to be retracted away from the anvil, thus releasing its grip on the packaging sheets. The packaging sheet section downstream of the cutter is accordingly released and slides down the curved guideplate 99 as a completed package indicated at 101. Adjustable side guides 103 may be provided to help direct the completed package.

Upon the retraction of the cutter 89, the packaging sheets upstream of the cutter are no longer gripped between cutter and anvil, so that springs 83 pivot the frame 77 back to the vertical position against stop 90. The cutter frame is now ready to make the next transverse cut and heat-seal. Arcuate fingers 96 extend from the anvil and follow it in its downstream movement to help suport the downstream end of the packaging sheet assembly while the anvil is later returned by springs 83. One cycle of such heat-sealing transversely seals the packaging sheets on both sides of the cutter blade, so that it closes the downstream end of the package being cut loose as well as the upstream end of the next package.

The cutter 89 preferably has its cutting edge inclined guillotine-style at about a 5° to 20° angle with respect to the anvil which can be horizontal. This inclination gives the cutting a scissors-like action that reduces the cutting force.

FIG. 5 illustrates a modified cutting and heat-sealing structure that should require less cleaning. Here the anvil 193 has a blade-receiving groove 194 cut into its upper face at an angle of 5° from the vertical which is indicated by dash line 196. The angle is exaggerated somewhat for greater clarity. This provides the anvil with a cutting edge 197 that has a little overhang with respect to the adjacent groove face 198. A similar tilt is provided at the face 188 of a cutter bar 189 that has a cutting edge 187 that co-acts with anVil edge 197 to do the cutting. Cutting edge 187 has a guillotine-type inclination as shown at 186 as well as an upward rake 185.

Blade 189 is held in an appropriate groove in cutter bar 184, as by a series of set screws 183, without interfering with the heating provided by electric heating wires fitted in grooves 170. Similar heating grooves 171 are in anvil 193. The heating-groove-containing faces of the cutter bar and the anvil can be cut n removable face plates of both, for ease of assembly.

Because of the overhang of the cutting edges 197 and 187, debris resulting from the cutting action does not tend to build up to the point that it interferes with the cutting. The overhang can be as little as about 3 degrees and as much as about 10° if desired, and can be confined to only one of the cutting edges.

To help the incoming packaging sheets push the transverse sealing assembly 75, the cutter actuation can be connected to independently start rotating that assembly, as by having the side face of cutter 89 engage a cam 92 as the cutter reaches heat-sealing engagement.

The guide angles 26 and pinch discs are all arranged to be adjusted for packaging sheets of different width. The transverse cutter extends to the maximum width of the guide angles and needs no width adjustment.

It is also helpful to apply some pre-heat to the transverse sealing site. Thus a long thin heat lamp 106 can be mounted in a reflector 108 that directs the lamp output as a narrow band approximately $\frac{1}{2}$ inch wide and as long as the entire width of the transverse sealing assembly. The lamp-carrying reflector 108 is pivotally mounted as at 110 so that it can pivot and in this way longitudinally scan along the longitudinally sealed packaging sheet assembly immediately upstream of the transverse sealing site.

This scanning is shown as controlled by a control arm 112 projecting downwardly from the reflector and having a sensing tip 114 hanging in the path of the bumps formed where the packaged articles are sandwiched. As such a bump reaches the freely hanging tip during the progress of the packaging, it engages and pushes the tip in the downstream direction thus tilting reflector 108 to cause the pre-heat it directs, to scan downstream in synchronism with the sandwiched articles.

Sensing tip 114 is shaped and pivoted with relation to the shapes of the bumps, to cause the reflector tilting to remain accurately focussed at the same location on the top surface of the upper packaging sheet 22, moving with that sheet so as to effectively pre-heat that location just before the transverse heat-sealing takes place at that location. To this end the sloping nose of a bump coacts with the tip 114 to gradually slow the rate of reflector tilt a little, after the tilting starts to thus compensate for the extra advancing effect that the tilting has on the heat projection. The transverse heat-sealing is shown as controlled by a limit switch 120 in the tilt path of control arm 112.

Tip 114 is made springy and short enough to be tilted completely out of the way as, or shortly after, switch 120 is actuated, so that the bump causing the tilting passes by. When that passage is completed the tip is pulled back to the illustrated position by return spring 122, and is now ready for the next bump.

Instead of, or in addition to, the preheating of the upper surface of the upper sheet 22, similar pre-heating can be applied to the lower surface of packaging sheet 21 in corresponding locations. The same control can be used to direct both such transverse pre-heatings. Infrared radiation can also be used to pre-heat the foam face of packaging sheet 22 along the heat-sealing region, as that sheet travels around disc 41. Pre-heating can also be applied to the lower face of packaging sheet 21.

The heat lamps 70 can be replaced by electric resistance heaters fitted to the outer faces of the discs and electrically insulated from those faces. Such heaters have circular contacts that are carried by the discs and are engaged by fixed brushes connected to a supply of electric current.

The output of the packaging machine can be increased by widening it so that it operates on packaging sheets twice as wide and then fitting each pinching disc shaft with an additional pinching disc midway between the two illustrated in FIG. 2. The two additional pinching discs can moreover be provided with a cutting edge and mating groove so that they slit the wide packaging sheet longitudinally along its center line, and also heat seal on both sides of the slit. Articles can then be simultaneously packaged on each lateral half of the packaging sheet combination.

FIG. 4 illustrates another technique for increasing the packaging speed. Here an apparatus like that of FIGS. 1–3 has a transverse sealing frame 175 that carries two transverse cutter-and-anvil assemblies 180, 280 spaced apart an adjustable distance by linkage 179. Both of these assemblies can be operated at the same time so that two time-consuming transverse cut-and-seal operations are completed at one stroke. A packaging sheet combination can accordingly b moved through the apparatus of FIG. 4 about twice as fast as through the apparatus of FIG. 1. The transverse pre-heating of FIG. 1 can also have a second such preheater immediately upstream of the downstream cutter, operated by the same control that operates the upstream transverse preheater. Interdigitated fingers 181, 281 extending toward each other from the respective anvils move under the sandwiched sheet assembly to help guide the anvils under that assembly in their upstream return stroke.

For the present invention it is desirable to use polyethylene foams, and particularly foams of low-melting polyethylene which can be heat-sealed at 95° C. or even somewhat lower. Foams made of well-plasticized resins are also desirable because they also have low melting points. The anti-stat and volatile corrosion inhibitors are preferably plasticizing agents for the resins they are coated on, to lower their melting points. However polypropylene, polystyrene and other heat-sealable foams can also be used.

Where high output is not needed, the machine can be operated stepwise so that the packaging sheets are given a succession of stepwise advances with the sheets stationary between steps. The stationary dwells are made sufficiently long in time to permit the guillotine cutter to cut and heat-seal transversely. At the same time the longitudinal heat-sealing discs should not be so hot as to char the sheets during the dwell for the transverse heat-sealing. The transverse heat-seal frame 75 need then not be pivotally mounted.

The supported foam laminates used in the present invention can have supporting laminations that need not be paper. While paper is a very desirable supporting member by reason of its low cost as well as its strength and resistance to damage by the heat needed for heat-sealing, the paper can be replaced by sheets of felted fibers other than cellulose or by plastic films or even metal foil. Foils of metal such as aluminum preferably have thicknesses of up to about 10 mils, inasmuch as greater thicknesses unduly add to the expense as well as to stiffness of the supported foam.

Metal supporting layers sandwiched about an electrically-sensitive object can be electrically connected together by the cutting action that separates individual packages, or by stapling or the like, to form an electrical shield around the object packaged. Metal supporting layers are also very highly conductive to heat so that heat-sealing times can with metal-foam laminates be reduced to less than ½ second.

Polyethylene terephthalate films or felted fiber sheets that withstand temperatures of about 160° C. that may be applied to effect heat-sealing, are also suitable, and can be used in film or sheet thicknesses as small as ½ or 1 mil. Such small thicknesses are still quite strong and also reduce the time required for the heat-sealing heat to penetrate through to the foam.

Supporting layers of woven or unwoven strips of plastic film about 1 to 3 millimeters wide can also be laminated to the heat-sealable foam to make packaging sheets.

A foam support an be made of combinations of layers. Thus a paper layer can be reinforced with glass or other fibers or laminated with metal foil or plastic film.

Obviously many modifications and variations of the present invention are possible in light of the above teachings. It is therefore to be understood that within the scope of the appended claims the invention may be practiced otherwise than as specifically described.

What is claimed is:

1. In the process of automatically packaging a series of articles to be protected against mechanical shock as well as against static electricity or corrosion, the improvement according to which the articles are successively sandwiched between the foam faces of sheets of backed plastic foam in which the foam is a cushioning layer not over about 3/16 inch thick adhered to backing that is not over about 1/16 inch thick but has a tensile strength at least twenty times that of the foam, the face of the sandwiching foam is coated with an anti-stat or corrosion-inhibiting layer, the backing is or is a laminate of aluminum foil, and the sandwiched sheets are heat-sealed to each other by applying the heat-sealing heat to the backing.

2. The combination of claim 1 in which the foam is resilient and the backing also contains a paper lamination.

3. In the process of automatically packaging a series of articles by providing two elongated wrapping sheets that are heat-sealable to each other, advancing one of the sheets generally horizontally while holding it with its transverse axis generally horizontal to form a generally horizontal receiving surface, placing the series of articles on the advancing sheet with each of the articles spaced from the adjacent articles by a distance that permits transverse heat sealing of the sheet between them, and with the articles spaced from the side edges of the sheet to permit heat sealing of those edges, applying the second sheet in heat-sealing relation over the advancing first sheet to sandwich the placed articles between them, advancing the resulting sandwiched assembly through a finishing mechanism that transversely heat seals the sheets together between individual articles and severs the resulting assembly into individually packaged articles, and pre-heating at least one of the sheets at locations where the heat sealing is subsequently effected, the improvement according to which the pre-heating includes the irradiation from a reciprocating transversely oriented infra-red generator of the outer face of at least one of the sheets as the sandwiched assembly moves to the finishing assembly, and the generator is not part of the finishing mechanism but is moved in synchronism with the advance of the sandwiched assembly to direct the irradiation at the transverse line at which the transverse heat sealing will take place.

4. The comination of claim 3 in which the synchronized transverse pre-heating is by infra-red irradiation of the upper surface of the second sheet just before the sheets are transversely heat sealed.

5. The combination of claim 3 in which the synchronized pre-heating is applied to both outer faces of the sandwiched assembly.

6. In an automatic packaging apparatus having an advancing zone, a sandwiching portion in which elongated heat-sealable wrapping sheets are automatically sandwiched around a succession of articles to be separately packaged as they move into the zone, longitudinal heat-sealing means for heat sealing the side edges of the sandwiched assembly as it advances along the zone, and a transverse heat-sealing and-severing means connected for heat sealing and severing the sandwiched assembly as it leaves the zone, the improvement according to which the transverse heat-sealing-and-severing means contains a pair of co-acting heat-sealing jaws mounted for rotation as a pair around a pivot to reciprocate to and fro in such rotation as a continuation of the advancing zone and to receive, heat seal and sever the sandwiched assembly into individually packaged articles as the assembly advances.

7. The combination of claim 6 in which the transverse severing means has heating-and-severing stroke means connected to the co-acting jaws to effect the heat-sealing severing as the transverse severing means pivots in the advancing direction.

8. The combination of claim 7 in which the severing stroke means is connected to effect two spaced heat sealings and severings of the sandwiched assembly during one pivoting advance.

9. In the process of automatically packaging a series of articles to be protected against mechanical shock as well as against static electricity or corrosion, the improvement according to which the articles are successively sandwiched between the foam faces of sheets of backed plastic foam in which the foam is a cushioning layer not over about 3/16 inch thick adhered to backing that is not over about 1/16 inch thick but has a tensile strength at least twenty times that of the foam, the face of the sandwiching foam is coated with an anti-stat or corrosion-inhibiting layer, the backing is or is a laminate of aluminum foil, heat sealing the sheets to each other to hold each article in a separate sandwich and pre-heating the foam face of at least one of the sheets at a heat-sealing site before completing the sandwiching at that site.

* * * * *